(12) United States Patent
Hales et al.

(10) Patent No.: US 9,079,605 B2
(45) Date of Patent: Jul. 14, 2015

(54) METHOD FOR POWER STEERING SYSTEMS

(75) Inventors: Michael K. Hales, Midland, MI (US);
Eduardo Audino Novo, Lamorlaye (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1187 days.

(21) Appl. No.: 12/581,936

(22) Filed: Oct. 20, 2009

(65) Prior Publication Data

US 2010/0100283 A1     Apr. 22, 2010

Related U.S. Application Data

(60) Provisional application No. 61/106,818, filed on Oct. 20, 2008.

(51) Int. Cl.
| | |
|---|---|
| *G06F 19/00* | (2011.01) |
| *B62D 6/10* | (2006.01) |
| *B62D 5/04* | (2006.01) |
| *B62D 6/00* | (2006.01) |

(52) U.S. Cl.
CPC .............. *B62D 5/0463* (2013.01); *B62D 6/008* (2013.01)

(58) Field of Classification Search
CPC ........... B62D 5/09; B62D 6/008; B62D 5/006
USPC .............................................. 701/41; 180/446
See application file for complete search history.

(56) References Cited

U.S. PATENT DOCUMENTS

| | | | |
|---|---|---|---|
| 2002/0035424 A1* | 3/2002 | Kaufmann et al. | 701/41 |
| 2002/0157894 A1* | 10/2002 | Hjelsand et al. | 180/446 |
| 2003/0055544 A1* | 3/2003 | Amberkar | 701/41 |
| 2008/0133087 A1 | 6/2008 | Klein et al. | |

FOREIGN PATENT DOCUMENTS

| | | |
|---|---|---|
| EP | 1286456 A1 | 2/2003 |
| EP | 1759956 A1 | 3/2007 |
| EP | 1932745 A2 | 6/2008 |
| WO | 2006099483 A1 | 9/2006 |

OTHER PUBLICATIONS

International Search Report for related European Application No. 09 013 236.6 dated May 16, 2014; 6 pages.

* cited by examiner

*Primary Examiner* — Redhwan K Mawari
*Assistant Examiner* — Rodney P King
(74) *Attorney, Agent, or Firm* — Cantor Colburn LLP (57) ABSTRACT

A method for controlling a steering system of a vehicle is provided. The method includes receiving a measured hand wheel torque signal indicating a measured hand wheel torque of the steering system. A desired hand wheel torque signal is generated, the desired hand wheel torque signal being indicative of a desired hand wheel torque for the steering system. A hand wheel torque tracking error signal based on the measured hand wheel torque signal and the desired hand wheel torque signal is then calculated. To adjust an amount of motor torque applied to the steering system, a desired compensation torque signal is generated based on the hand wheel torque tracking error signal multiplied by a calibration constant.

17 Claims, 4 Drawing Sheets

METHOD FOR POWER STEERING SYSTEMS

CROSS-REFERENCE TO RELATED APPLICATIONS

This application claims the benefit of U.S. Provisional Patent Application Ser. No. 61/106,818, filed on Oct. 20, 2008, the contents of which are incorporated by reference herein.

BACKGROUND OF THE INVENTION

Current electric power steering systems can have a lack of ability at tuning on-center response. Specifically, in the on-center region, the hand wheel torque versus hand wheel angle response can be to low (not enough hand wheel torque gradient), and the hand wheel torque versus vehicle response (i.e., yaw rate) can often times be too low (not enough steering feedback for a given yaw rate). These described issues tend to worsen with high friction steering systems, low response vehicle tires and chassis not building up enough on-center loads. These effects are present on current vehicles.

Existing tuning tools typically require trade-offs. For instance, one of the recognized trade-offs is acceptable hand wheel torque with hand wheel angle, but not enough steering response. Another recognized trade-off is acceptable vehicle response, but not enough hand wheel torque build-up with hand wheel angle.

SUMMARY OF THE INVENTION

These and other advantages and features will become more apparent from the following description taken in conjunction with the drawings.

According to one aspect of the invention, a method for controlling a steering system of a vehicle is provided. The method includes receiving a measured hand wheel torque signal indicating a measured hand wheel torque of the steering system; generating a desired hand wheel torque signal, the desired hand wheel torque signal being indicative of a desired hand wheel torque for the steering system; generating a hand wheel torque tracking error signal as a function of the measured hand wheel torque signal and the desired hand wheel torque signal; and generating a desired compensation torque signal to adjust an amount of motor torque applied to the steering system based on the hand wheel torque tracking error signal multiplied by a calibration constant.

According to another aspect of the invention, a method for controlling a steering system of a vehicle is provided. The method includes measuring a hand wheel torque and a vehicle velocity; determining a desired hand wheel torque for the steering system at the controller; determining a hand wheel torque tracking error by subtracting the desired hand wheel torque from the measured hand wheel torque at the controller; and determining a desired compensation torque by multiplying the hand wheel torque tracking error signal by a calibration constant, the desired compensation torque adjusting an amount of motor torque applied to the steering system for approximating the measured hand wheel torque to the desired hand wheel torque.

According to yet another aspect of the invention, a system for controlling a steering system of a vehicle is provided. The system includes a motor operably coupled to the steering system, the motor is configured to apply an amount of motor torque to the steering system for steering the vehicle; and a controller configured to control operation of the steering system, the controller configured to receive a measured hand wheel torque signal indicating a measured hand wheel torque of the steering system, the controller further configured to generate a desired hand wheel torque signal indicative of a desired hand wheel torque for the steering system, the controller further configured to generate a hand wheel torque tracking error signal based on the measured hand wheel torque signal and the desired hand wheel torque signal, and the controller configured to generate a desired compensation torque signal to adjust the amount of motor torque applied to the steering system based on the hand wheel torque tracking error signal multiplied by a calibration constant.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The invention is directed to a method for controlling a steering system of vehicle by implementing a tuning algorithm. Exemplary embodiments add additional tuning flexibility to enhance the on-center steering feel and vehicle response. The invention is also directed to a control system for controlling a steering system of a vehicle. The control system generates a desired compensation torque signal to adjust the motor torque applied to the steering system such that the measured hand wheel torque is approximated to or is adjusted towards the direction of the desired hand wheel torque.

For all general purposes, the term "signal" as used herein is defined as any electrical signal or any stored or transmitted value. For example, a signal can comprise a voltage, or a current. Further, a signal can comprise any stored or transmitted value such as binary values, scalar, values, or the like.

As used herein, the term "controller" refers to an application specific integrated circuit (ASIC), and electronic circuit, a processor (shared, dedicated, or group) and memory that executes one or more software or firmware programs/algorithms, a combinational logic circuit, and/or other suitable components that provide the described functionality.

Figure 1:
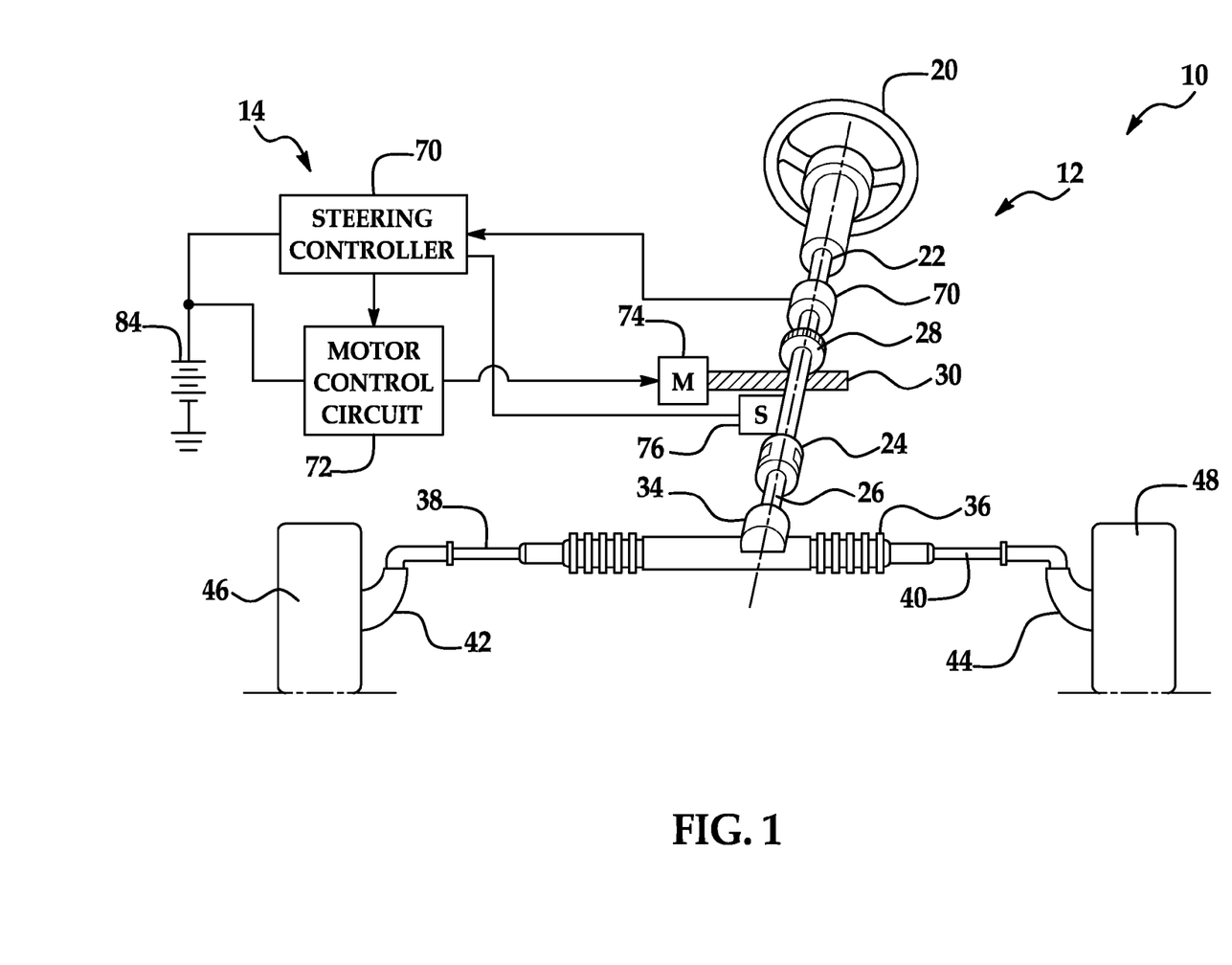
FIG. 1 is a schematic of a vehicle having a steering system and a control system in accordance with the invention.
Figure 2:
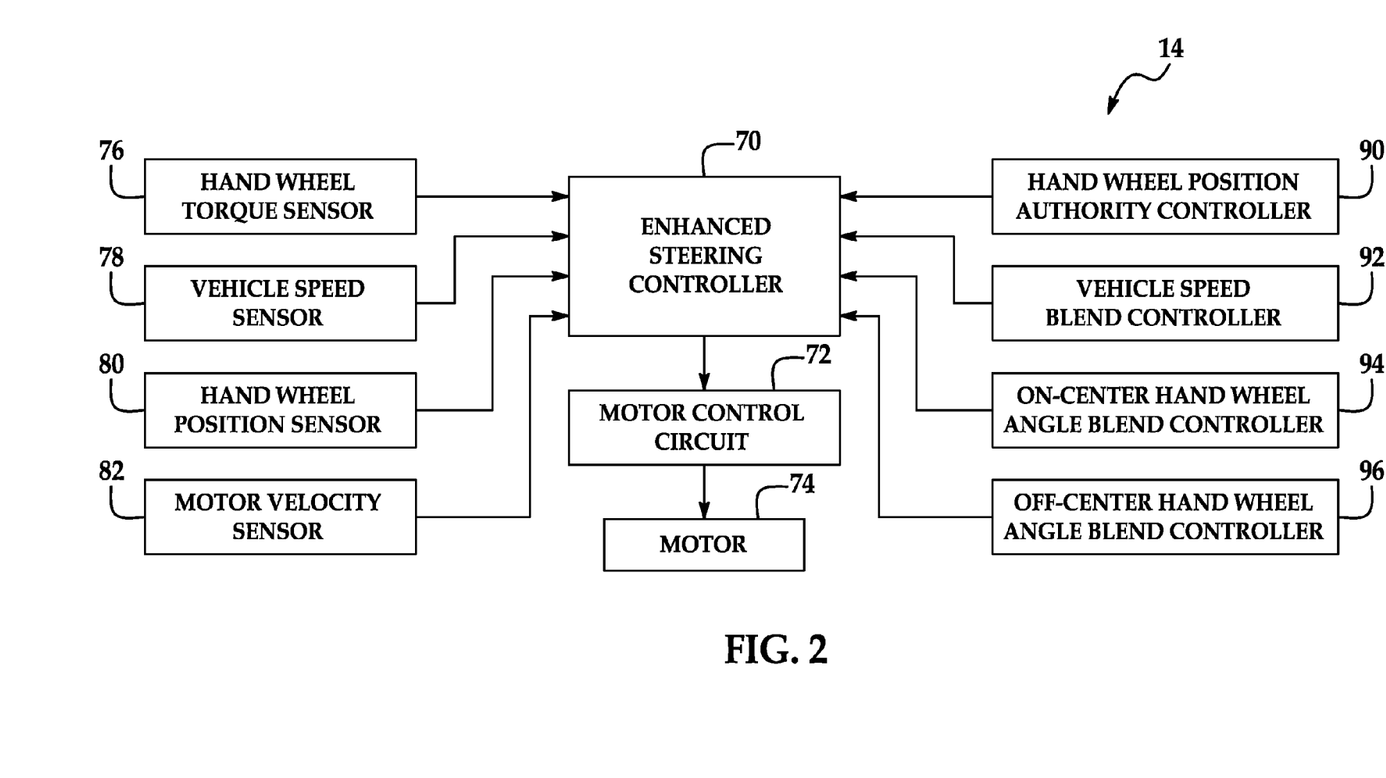
FIG. 2 is a block diagram of a control system in accordance with one aspect of the invention.

Referring now to the drawings, FIGS. 1 and 2 illustrate a vehicle 10 having a steering system 12 and a control system 14. The control system 14 is in signal communication with the steering system 12 to assist in controlling the steering system 12, which is configured to steer the vehicle 10 in a direction controlled by a user or operator of the vehicle 10.

FIG. 1 illustrates the basic elements of the steering system 12 in accordance with one exemplary embodiment. The steering system 12 generally includes a steering wheel or hand wheel 20, an upper steering shaft 22, a universal joint 24, a lower steering shaft 26, a worm gear 28, a worm 30, a gear housing 34, a steering mechanism 36, tie rods 38, 40, steering knuckles 42, 44, and roadway wheels 46, 48. In one exemplary embodiment, the steering system 12 is an electric power steering system that utilizes a rack and pinion steering mechanism 36. The steering mechanism includes a tooth rack (not shown) and a pinion gear (not shown) located within the gear housing 34. During operation, as a user (vehicle operator) turns the hand wheel 20, the upper steering shaft 22 connected to the lower steering shaft 26 turns the pinion gear. Rotation of the pinion gear moves the tooth rack, which moves the tie rods 38, 40 which in turn moves the steering knuckles 42, 44, respectively, which turns the road way wheels 46, 48 respectively. Of course, other steering system configurations can be used in accordance with other exemplary embodiments and should not be limited to the configuration described herein.

In accordance with one exemplary embodiment, the control system 14 implements a tuning algorithm for adding additional tuning flexibility to enhance on-center steering feel and vehicle response. In particular, the control system 14 is configured to generate an output signal used to adjust the motor torque applied to the steering system tuning the on-center response of the vehicle. The control system 14 generally includes an enhanced steering controller 70, a motor control circuit 72, a motor 74, a hand wheel torque sensor 76, vehicle speed sensor 78, hand wheel position sensor 80, a motor velocity sensor 82, and a battery 84. The battery 84 is electrically coupled to the steering controller 70 and the motor control circuit 72 to provide electrical power to both steering controller 70 and motor control circuit 72.

In accordance with one exemplary embodiment, the control system 14 further includes a hand wheel position authority controller 90, a vehicle speed blend controller 92, an on-center hand wheel angle blend controller 94 and a off-center hand wheel angle blend controller 96. Each of the controllers 90, 92, 94, and 96 are configured to disable the output signal from being received by the steering system 12 or scale the output signal such that the motor torque gradually scales up to or moves away from the desired hand wheel torque.

In one embodiment, the hand wheel torque sensor 76 is in signal communication with the steering controller 70. The hand wheel torque sensor 76 is configured to generate a measured hand wheel torque signal indicative of a measured hand wheel torque of the vehicle steering system. In other words, the hand wheel torque signal indicates the amount of torque being applied to the hand wheel 20 by the operator. In one non-limiting exemplary embodiment, the hand wheel torque sensor 76 includes a torsion bar (not shown) which outputs a variable-resistance signal to the controller 70 based on an amount of torque applied to the torsion bar. Of course, other types of torque sensors can be used in other exemplary embodiments.

In one embodiment, the vehicle speed sensor 78 is in signal communication with the steering controller 70. The vehicle speed sensor 78 is configured to generate a measured vehicle speed signal indicative of a measured vehicle speed of the vehicle. The vehicle speed sensor 78 can be any conventional or later developed sensor for measuring the speed of the vehicle.

In one embodiment, the hand wheel position sensor 80 is in signal communication with the steering controller 70. The hand wheel position sensor 80 is configured to generate a measured hand wheel position or angle signal indicative of a rotational or angular position of the hand wheel 20. For example, the hand wheel position sensor 80 can sense whether the hand wheel 20 is being turned away from its center position. The hand wheel position sensor 80 can be any conventional or later developed sensor for measuring the angular position of the hand wheel.

In one embodiment, the motor velocity sensor 82 is in signal communication with the steering controller 70. The motor velocity sensor 82 is configured to generate a motor velocity signal indicative of a rotational, velocity of the motor 74. The motor velocity is directly proportional to the velocity of the hand wheel 20. The motor velocity sensor 82 can be any conventional or later developed sensor for measuring the velocity of the motor 74. In an alternative embodiment, a dedicated hand wheel velocity sensor (not shown) can be used to measure hand wheel velocity for the steering controller 70. Of course, other sensor types can be used to determine, calculate or estimate hand wheel velocity and should not be limited to the examples described herein.

Figure 3:
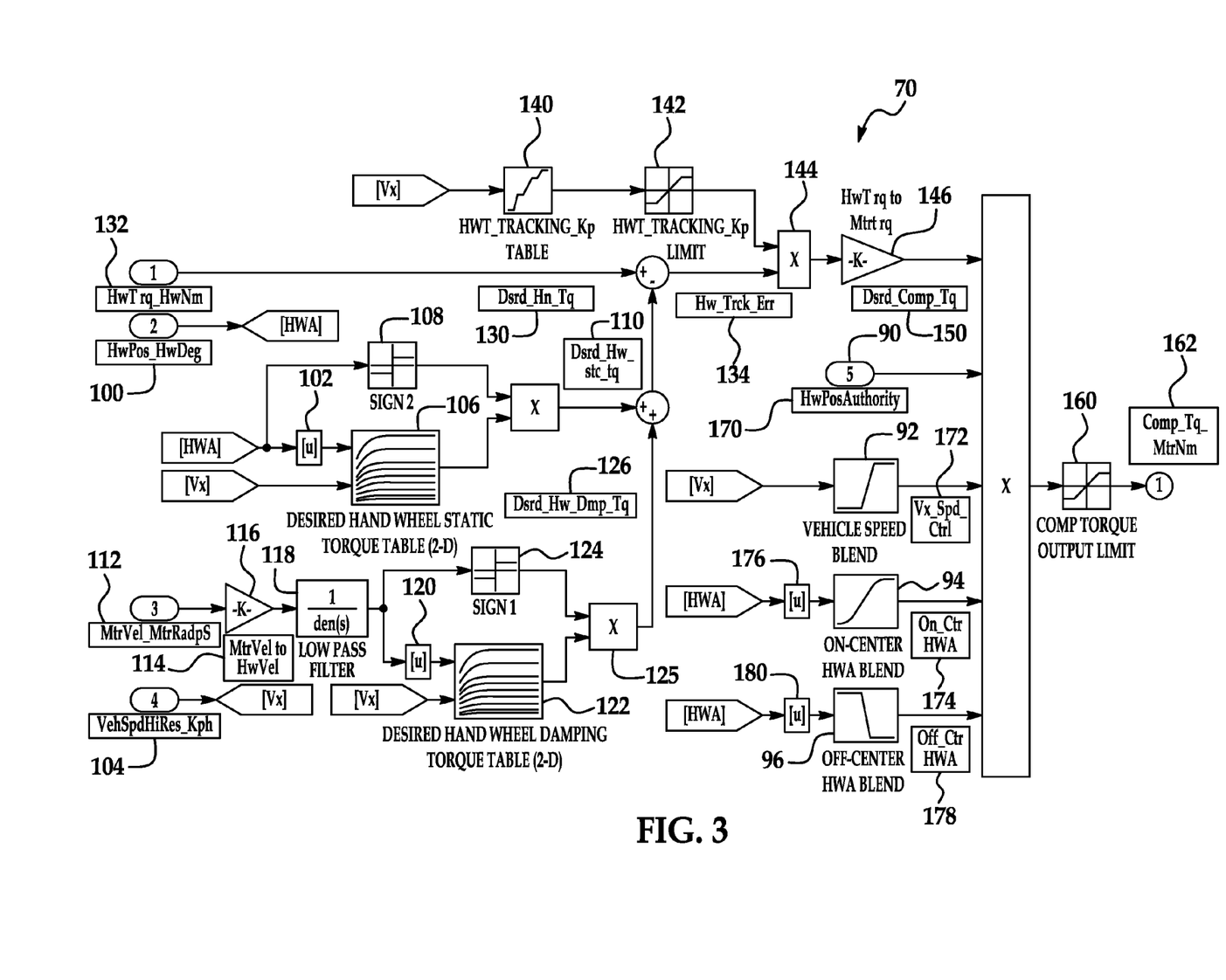
FIG. 3 is a schematic of a control system in accordance with another aspect of the invention.

Now turning to FIG. 3 illustrating the tuning algorithm implemented by the enhanced steering controller 70 to assist in controlling the steering system 12 in accordance with one exemplary embodiment. During a steering operation, the controller 70 receives the measured hand wheel angle signal, indicated by signal 100 (HwPos_HwDeg or HWA), indicating the measured hand wheel angle detected by the hand wheel position sensor 80. The controller 70 takes the absolute value of the measured hand wheel angle signal 100 at function block 102. The controller 70 compares the absolute value of the measured hand wheel angle signal 100 and the measured vehicle velocity signal, indicated by signal 104 (VehSpdHiRes_Kph or $V_x$), with a first look-up table 106 to select a desired hand wheel static torque value. The sign of the measured hand wheel angle signal indicating the direction (right or left) of the vehicle is captured at function block 108 and is multiplied at function block 109 by the desired hand wheel static torque value to determine a desired hand wheel static torque, indicated by signal 110 (Dsrd_Hw_Stc_Tq). The first look-up table 106 is a tuning table that includes a plurality of desired hand wheel static torque values each corresponding to one of a plurality of hand wheel angle measurements and one of a plurality of vehicle speed measurements. As such, the desired hand wheel static torque signal 110 generated by the controller 70 is based on the relationship between the speed and hand wheel angle of the vehicle 10.

In this tuning algorithm, the controller 70 receives the measured motor velocity signal, indicated by signal 112 (MtrVel_MtrRadpS), and converts the measured motor velocity signal into a measured hand wheel velocity signal, indicated by signal 114 (MtrVel_to_HwVel), at function block 116. Alternatively, the controller 70 directly receives a measured hand wheel velocity signal. The controller 70 filters the hand wheel velocity signal 114 through a low-pass filter 118, which reduces the effect of undesirable noise in the signal, and takes the absolute value of the filtered hand wheel velocity signal at function block 120. The controller 70 compares the absolute value of the filtered hand wheel velocity signal and the measured vehicle velocity signal 104 with a second look-up table 122 to select a desired hand wheel damping torque value. The sign of the hand wheel velocity signal 114 indicating the speed the operator is steering the vehicle is captured at function block 124 and is multiplied at function block 125 by the desired hand wheel damping torque value to determine a desired hand wheel damping torque, indicated by signal 126 (Dsrd_Hw_Dmp_Tq). The second look-up table 122 is another tuning table that includes a plurality of desired hand wheel damping torque values each corresponding to one of a plurality of hand wheel velocity measurements and one of a plurality of vehicle speed measurements. As such, the desired hand wheel damping torque signal 126 generated by the controller 70 is based on the relationship between the speed and hand wheel velocity of the vehicle 10.

The first and second look-up tables 106, 122 can each be defined based on subjective feel while tuning the steering system in vehicle on a test track and/or based on objective data measured in vehicle. The look-up tables can be predetermined and specific to vehicle versions. The first and second look-up tables 106, 122 can be tables that are manually or automatically updated continuously or periodically. In one embodiment, the first and second look-up tables can be initially created or updated (continuously or periodically) utilizing equations and/or algorithms that are based generally on the concept of self-learning.

The controller 70 takes the summation of or combines the desired hand wheel static torque signal 110 and the desired hand wheel damping torque signal 126 to generate a desired hand wheel torque signal, indicated by signal 130 (Dsrd_Hw_Tq). The controller 70 subtracts the desired hand wheel torque signal 130 from the measured hand wheel torque signal, indicated by signal 132 (HwTrq_HwNm), to create a hand wheel tracking error signal, indicated by signal 134 (Hw_Trck_Err). This tracking error signal 134 indicates how much torque the motor needs to apply to the steering system to approximate the hand wheel torque to the desired hand wheel torque. A calibration constant is selected from a hand wheel torque tracking table 140 based on the measured vehicle velocity signal 104. Thus, the calibration constant is a function of the measured vehicle velocity. In accordance with one embodiment, a saturation function block 142 receives the calibration constant to limit the value of the selected calibration constant preventing instability or a twitchy system. In other words, the calibration constant is constrained at upper and lower limits. The calibration constant is a measure of how hard the motor is going to try to match the measured hand wheel torque to the desired hand wheel torque. The hand wheel torque tracking table 140 can be manually or automatically updated continuously or periodically depending on the application. Further, the hand wheel torque tracking table 140 can be initially created or updated (continuously or periodically) utilizing equations and/or algorithms that are based generally on the concept of self-learning.

The controller 70 multiplies the hand wheel torque tracking error signal 134 with the selected calibration constant at function block 144 to generate a hand wheel torque signal, which in turn is converted into a motor torque signal at function block 146. As a result, a desired compensation torque signal, indicated by signal 150 (Dsrd_Comp_Tq) is generated for the steering system 12 to add additional tuning flexibility and enhance on-center steering feel and vehicle response. The desired compensation torque signal 150 is indicative of the additional amount of torque the motor 74 needs to apply to the steering system 12 in order to adjust the measured hand wheel torque towards the direction of the desired hand wheel torque. As a result, hand wheel torque is more appropriately matched to vehicle response with proportional control.

In accordance with one embodiment, the desired hand wheel torque signal is limited by a compensation torque output limiter 160 in order to prevent an undesirable amount of torque to the steering system 12. As such, the compensation torque output limiter 160 is configured to generate a compensation torque motor signal, indicated by signal 162 (Comp_Tq_MtrNm). The compensation torque output limiter 130 prevents too much or too little torque to the steering system 12. In other words, the compensation torque output limiter 130 prevents the desired hand wheel torque from going beyond an upper limit and a lower limit. Therefore, the desired compensation torque signal 150 can be equal to the compensation torque motor signal 162 as long as the desired compensation torque signal is at or within its upper and lower limit.

In accordance with one embodiment, the motor control circuit 72 is in signal communication with the steering controller 70 and is configured to receive the compensation torque motor signal 162 from controller 70. The motor control circuit 72 controls the amount of motor torque generated by the motor 74 based on the compensation torque motor signal 162. In accordance with one exemplary embodiment, the compensation torque motor signal 162 is an additional motor torque command that is based on how close the measured hand wheel torque signal 132 is approximated to the desired hand wheel torque signal 130. The compensation torque motor signal 162 is a command added to the traditionally generated commands/signals. Therefore, the desired hand wheel torque signal does not replace previous methods for tuning the vehicle 10 for good steering feel, but adds additional tuning flexibility.

In accordance with one exemplary embodiment, the controller 70 scales the desired compensation torque signal in response to at least one of a plurality of scaling signals configured to disable the desired compensation torque signal 150. In other words, one or more scaling signals can operably prevent the desired compensation torque signal from being received by the steering system 12. The desired compensation torque signal can be disabled by a signal generated by the hand wheel position authority controller 90, vehicle speed blend controller 92, on-center hand wheel angle blend controller 94, off-center hand wheel angle blend controller 96 or a combination thereof. In one embodiment, one or more scaling signals enable the steering controller 70 to scale the desired compensation torque signal 150 in a manner such that the motor torque is gradually adjusted towards or away from the desired compensation torque in order to provide a natural steering feel.

The hand wheel position authority controller 90 is in signal communication with the steering controller 70 in accordance with one exemplary embodiment. The hand wheel position authority controller 90 is configured to generate a hand wheel authority signal, indicated by signal 170 (HwPos_Authority), indicating the accuracy of the measured hand wheel position. In other words, the hand wheel authority signal indicates the validity of the hand wheel position sensor 80. The hand wheel authority signal operably disables the desired compensation torque signal when the measured hand wheel position is not accurate. For example, if the measured hand wheel position is more than a single revolution (360 degrees) off, the desired hand wheel torque signal is disabled since tuning the vehicle will not be effective with an inaccurate hand wheel position reading.

The vehicle speed blend controller 92 is in signal communication with the steering controller 70 in accordance with one exemplary embodiment. The vehicle speed blend controller 92 is configured to generate a vehicle speed control signal, indicated by signal 172 (Vx_Spd_Ctrl), indicating whether the measured vehicle speed is below a vehicle threshold, by receiving the measured vehicle speed signal 104. For example, if the vehicle is operating in a parking lot or a garage and is running at speeds below motor speed, on-center handling is not an issue. Thus, the tuning algorithm is not effective. However, once the vehicle speed rises to a level above the vehicle threshold as indicated by the vehicle speed control signal, the controller 70 scales the desired compensation torque signal 150 in order to gradually scale the motor torque up to the desired hand wheel torque. As the vehicle speed moves below the vehicle threshold, the controller 70 scales the desired compensation torque signal 150 in order to gradually remove the additional torque provided by the desired compensation torque signal 150. The transition is gradual in order to obtain good steering feel and to prevent discontinuities in performance.

The on-center hand wheel angle blend controller 94 is in signal communication with the steering controller 70 in accordance with one embodiment. The on-center hand wheel angle blend controller 94 is configured to generate an on-center hand wheel angle control signal, indicated by signal 174 (On_Ctr_HWA), indicating whether the measured hand wheel angle is below a first hand wheel threshold (e.g., near 0 degrees), based on taking the absolute value of the measured hand wheel angle signal at function bock 176. For example, if the hand wheel angle is near the center position, the tuning algorithm is turned off since on-center tuning is only effective when the hand wheel angle is, for example, approximately between 20 to 30 degrees from the center position. As the hand wheel angle transitions from approximately 0 degrees to approximately 20 degrees, the controller 70 scales the desired compensation torque signal 150 in order to gradually adjust the motor torque towards the desired compensation torque. The same operation is done when the hand wheel angle transitions from approximately 20 degrees towards the center position.

The off-center hand wheel angle blend controller 96 is in signal communication with the steering controller 70 in accordance with one embodiment. The off-center hand wheel angle blend controller 96 is configured to generate an off-center hand wheel angle control signal, indicated by signal 178 (Off_Ctr_HWA), indicating whether the hand wheel angle is above a second hand wheel threshold (e.g., 45 degrees), based on taking the absolute value of the measured hand wheel angle signal 100 at function block 180. For example, if the operator is making a sudden sharp turn, the tuning algorithm is not effective. As the hand wheel angle transitions below the second hand wheel threshold, the controller 70 scales the desired compensation torque signal 150 in order to gradually adjust the motor torque towards the desired compensation torque. The same operation is done when the hand wheel angle begins to transition above the second hand wheel angle threshold.

The measured hand wheel torque may not exactly match the desired hand wheel torque. However, the tuning algorithm described above will enable the measured hand wheel torque to be approximated to or closely matched with the desired hand wheel torque. This approximation will depend on how close the desired hand wheel torque is calibrated on the look-up tables 106,122 compared to the measured hand wheel torque and is dependent of vehicle steering response characteristics (e.g., chassis response, steering ratio, tires response, etc.). The tuning algorithm described above operates to obtain the desired response without generating an unnatural response that does not match what the user would naturally expect. This tradeoff between achieving the desired response without generating an unnatural response is determined when driving the system. Thus, the percentage of how close the measured hand wheel torque is approximated to the desired hand wheel torque will vary depending on the application. Therefore, as used herein, the term "match" or "matching" or "matched" refers to a range of values that is equal, estimated or approximated to the desired value as permitted or limited by the calibrations used by the system and/or components thereof.

Figure 4:
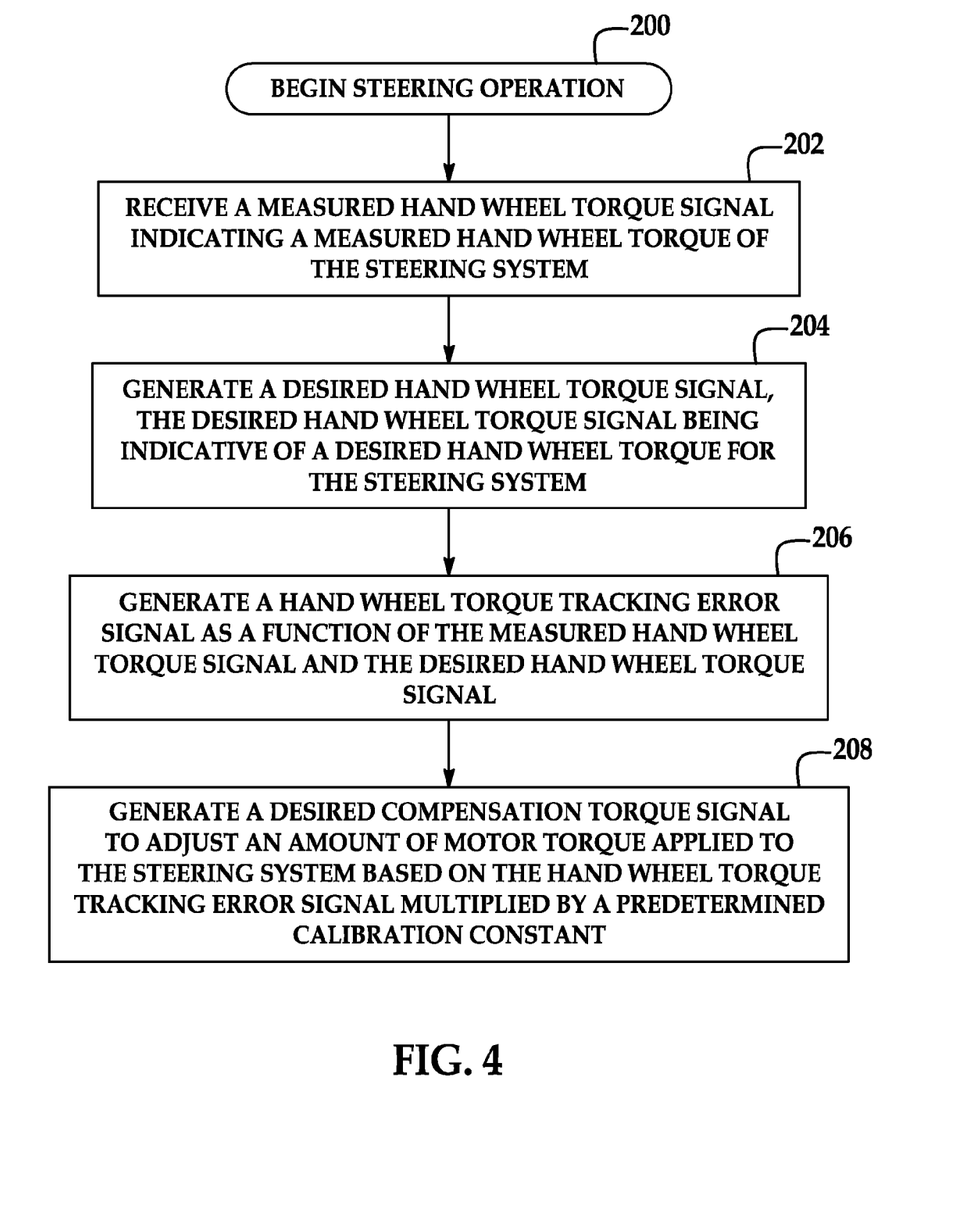
FIG. 4 is a flow diagram of a method for controlling a steering system of a vehicle in accordance with yet another aspect of the invention.

Now referring to FIG. 4, a method for controlling a steering system of a vehicle in accordance with one exemplary embodiment will now be described.

At operational block 200, begin steering operation.

At operational block 202, receive a measured hand wheel torque signal indicating a measured hand wheel torque of the steering system. The measured hand wheel torque signal can be received at a controller in accordance with one embodiment.

At operational block 204, generate a desired hand wheel torque signal where the desired hand wheel torque signal is indicative of a desired hand wheel torque for the vehicle steering system. The desired hand wheel torque signal can be generated at the controller in accordance with one embodiment.

At operational block 206, generate a hand wheel torque tracking error signal as a function of the measured hand wheel torque signal and the desired hand wheel torque signal. In accordance with one exemplary embodiment, the hand wheel torque tracking error is generated by subtracting the desired hand wheel torque signal from the measured hand wheel torque signal.

At operational block 208, generate a desired compensation torque signal to adjust an amount of motor torque generated for the steering system based on the hand wheel torque tracking error signal multiplied by a calibration constant. The desired compensation torque signal is intended to adjust the motor torque of the vehicle such that the measured hand wheel torque matches more closely to or adjusted towards the direction of the desired hand wheel torque.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method for controlling a steering system of a vehicle, comprising:
   receiving a measured hand wheel torque signal indicating a measured hand wheel torque of the steering system;
   determining a desired hand wheel static torque based on a measured vehicle speed and the measured hand wheel angle of the vehicle;
   determining a desired hand wheel damping torque based on the measured vehicle speed and a measured hand wheel velocity of the vehicle;
   generating a desired hand wheel torque signal by adding the desired hand wheel static torque and the desired hand wheel damping torque, the desired hand wheel torque signal being indicative of a desired hand wheel torque for the steering system;
   generating a hand wheel torque tracking error signal as a function of by comparing the measured hand wheel torque signal and the desired hand wheel torque signal;
   generating an on-center hand wheel angle control signal based on determining whether a measured hand wheel angle is at a center position, the center position being about zero degrees;
   generating a desired compensation torque signal to adjust an amount of motor torque applied to the steering system based on the hand wheel torque tracking error signal multiplied by a calibration constant; and adjusting the desired compensation torque signal based on the on-center hand wheel angle control signal, the desired compensation torque signal disabled responsive to an indication by the on-center hand wheel angle control signal that the measured hand wheel angle is at the center position.

2. The method of claim 1, wherein the determining the desired hand wheel static torque comprises comparing the measured vehicle speed and the measured hand wheel angle of the vehicle with a first look-up table specific to the vehicle.

3. The method of claim 2, wherein the first look-up table includes a plurality of desired hand wheel static torque values each corresponding to one of a plurality of hand wheel angle measurements and one of a plurality of vehicle speed measurements.

4. The method of claim 1, wherein the determining the desired hand wheel damping torque comprises comparing the measured vehicle speed and the measured hand wheel velocity of the vehicle with a second look-up table specific to the vehicle.

5. The method of claim 4, wherein the second look-up table includes a plurality of desired hand wheel damping values each corresponding to one of a plurality of hand wheel velocity measurements and one of a plurality of vehicle speed measurements.

6. The method of claim 1, further comprising generating at least one of a plurality of scaling signals configured to scale the desired compensation torque signal in order to enable the amount of motor torque applied to the steering system to gradually scale up to the desired hand wheel torque or disable the desired compensation torque signal.

7. The method of claim 1, wherein the calibration constant is a function of vehicle speed and is limited by a saturation threshold to prevent steering system instability.

8. The method of claim 1, wherein the desired compensation torque signal is utilized to adjust the amount of motor torque applied to the steering system approximating the measured hand wheel torque to the desired hand wheel torque.

9. A method for controlling a steering system of a vehicle comprising:
measuring a hand wheel torque and a vehicle velocity;
determining a desired hand wheel torque for the steering system at a controller;
determining a hand wheel torque tracking error by subtracting the desired hand wheel torque from the measured hand wheel torque at the controller;
generating a vehicle velocity control signal based on determining whether the vehicle velocity is below a vehicle velocity threshold;
determining a desired compensation torque signal by multiplying the hand wheel torque tracking error signal by a calibration constant, the desired compensation torque signal adjusting an amount of motor torque applied to the steering system for approximating the measured hand wheel torque to the desired hand wheel torque; and
adjusting the desired compensation torque signal based on the vehicle velocity control signal, the desired compensation torque signal disabled responsive to an indication by the vehicle velocity control signal that the vehicle velocity is below the vehicle velocity threshold.

10. A system for controlling a steering system of a vehicle comprising:
a motor operably coupled to the steering system, the motor configured to apply an amount of motor torque to the steering system for steering the vehicle; and
a controller configured to control operation of the steering system, the controller configured to receive a measured hand wheel torque signal indicating measured hand wheel torque of the steering system, the controller further configured to generate a desired hand wheel torque signal indicative of a desired hand wheel torque for the steering system, the controller further configured to generate on-center and off-center hand wheel angle control signals based on determining whether a measured hand wheel angle is below a first hand wheel angle threshold or above a second hand wheel angle threshold that is higher than the first hand wheel angle threshold, the controller further configured to generate a hand wheel torque tracking error signal based on by comparing the measured hand wheel torque signal and the desired hand wheel torque signal, the controller further configured to generate a desired compensation torque signal to adjust the amount of motor torque applied to the steering system based on the hand wheel torque tracking error signal multiplied by a calibration constant, and the controller further configured to adjust the desired compensation torque signal based on the on-center and off-center hand wheel angle control signals, the desired compensation torque signal disabled responsive to an indication by the on-center and off-center hand wheel angle control signals that the measured hand wheel angle is below the first hand wheel angle threshold or is above the second hand wheel angle threshold.

11. The system of claim 10, wherein the controller is further configured to scale the desired compensation torque signal in order to enable the amount of motor torque applied to the steering system to gradually scale up to the desired hand wheel torque based on the measured hand wheel angle of the vehicle.

12. The system of claim 10, wherein the controller is further configured to generate a velocity speed control signal configured to scale the desired compensation torque signal in order to enable the amount of motor torque applied to the steering system to gradually scale up to the desired hand wheel torque or disable the desired hand wheel torque or disable the desired compensation torque signal based on a measured vehicle velocity of the vehicle.

13. The system of claim 12, wherein the velocity speed control signal is configured to disable the desired compensation signal when the measured vehicle velocity is below a vehicle velocity threshold.

14. The system of claim 10, wherein the controller is further configured to generate a hand wheel position authority control signal configured to scale the desired compensation torque signal in order to enable the amount of motor torque applied to the steering system to gradually scale up to the desired hand wheel torque or disable the desired compensation torque signal based on the accuracy of the measured hand wheel angle of the vehicle.

15. The system of claim 10, wherein the desired hand wheel torque signal is generated by determining a desired hand wheel static torque and a desired hand wheel damping torque for the vehicle.

16. The system of claim 15, wherein the desired hand wheel static torque is determined by comparing a measured vehicle speed and the measured hand wheel angle of the vehicle with a first look-up table, the first look-up table includes a plurality of desired hand wheel static torque values each corresponding to one of a plurality of hand wheel angle measurements and one of a plurality of vehicle speed measurements.

17. The system of claim 15, wherein the desired hand wheel damping torque is determined by comparing a measured vehicle peed and a measured hand wheel velocity of the vehicle with a second look-up table, the second look-up table includes a plurality of desired hand wheel damping values each corresponding to one of a plurality of hand wheel velocity measurements and one of a plurality of vehicle speed measurements.

\* \* \* \* \*